J. V. GIESLER

June 10, 1930. THERMOSTATICALLY CONTROLLED VALVE UNIT Re. 17,696

2 Sheets-Sheet 1

Original Filed Jan. 6, 1927

Inventor
Jean V. Giesler,
By Mauro, Cameron, Davis & Kerkam
Attorneys

June 10, 1930. J. V. GIESLER Re. 17,696

THERMOSTATICALLY CONTROLLED VALVE UNIT

Original Filed Jan. 6, 1927 2 Sheets-Sheet 2

Inventor

By Jean V. Giesler

Mauro, Cameron, Lewis & Kirkham

Attorneys

Reissued June 10, 1930 Re. 17,696

UNITED STATES PATENT OFFICE

JEAN V. GIESLER, OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE

THERMOSTATICALLY-CONTROLLED VALVE UNIT

Original No. 1,675,341, dated July 3, 1928, Serial No. 159,499, filed January 6, 1927. Application for reissue filed February 21, 1930. Serial No. 430,430.

This invention relates to thermostatically operated valve mechanism, and particularly to thermostatically operated valve mechanism for regulating the circulation of cooling medium through the cooling system of an internal combustion engine. The invention is capable of embodiment in thermostatically operated valve mechanism both of the choker type wherein the position of the valve member determines the quantity of cooling medium circulating through the cooling system and of the by-pass type wherein the position of the valve member determines the path of the cooling medium circulating through the cooling system.

With the increase in use of thermostatically operated valve mechanism for controlling the circulation of cooling medium through the cooling systems of automobile engines, particularly of the medium priced and lower priced cars, there is an increasing demand for thermostatically operated valve mechanism which constitutes a self-contained unit and which is composed of a minimum number of parts so that it is simple and inexpensive to assemble and install.

It is an object of this invention to provide a device of the character described which is composed of a minimum number of simple parts which may be produced at a minimum expense and which are easy to assemble, so that a simplified thermostatically operated valve unit of low cost may be manufactured.

Another object of this invention is to provide a device of the character described wherein the valve seat and the mounting member for the unit are formed integrally with the support for the thermostat, so that the unit is composed of a few readily manufactured parts.

Another object of this invention is to provide a device of the character described wherein the valve seat and the parts for mounting and guiding the thermostat are formed integrally and may be readily assembled with the thermostat, being partible on a plane extending lengthwise of the thermostat.

Other objects will appear as the description of the invention proceeds.

The invention is capable of receiving a variety of mechanical expressions, two of which are shown on the accompanying drawings, but it is to be expressly understood that the drawings are for purposes of illustration only and are not to be construed as a definition of the limits of the invention, reference being had to the appended claims for that purpose.

Referring in detail to the drawings, wherein the same reference characters are employed to designate corresponding parts in the several figures, Fig. 1 is an elevation partly in longitudinal section of an embodiment of the present invention;

Figure 1:
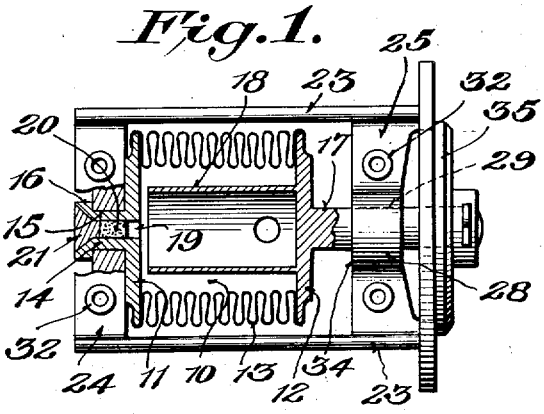

In the form shown in Figs. 1 to 5 inclusive, the thermostat 10 is illustrated as composed of a stationary end wall 11 and a movable end wall 12 suitably attached, as by soldering or brazing, to a deeply corrugated flexible tubular wall 13, preferably of resilient metal, and forming a closed chamber which is designed to receive volatile fluid of any suitable character. The stationary end wall 11 is shown as provided with a boss 14 which is reduced in diameter for a part of its length as shown at 15 so as to form a head 16 which is separated from said stationary end wall 11 by an annular groove formed by said reduced portion 15. The movable end wall 12 is shown as provided, integrally therewith or suitably attached thereto, with a valve stem 17, and internally of the thermostat, with a tubular stop 18 to limit the contraction of the thermostat when the same is not mounted in position, although said stop could be mounted on said stationary wall if desired. The thermostat is also provided with a suitable filling opening 19, shown as extending through the boss 14 and sealed by a stopper 20 and solder 21. The details of the construction of the thermostat form no part of the present invention, however, and it is to be expressly understood that the thermostat may be of any suitable size, construction and type.

Figure 4:
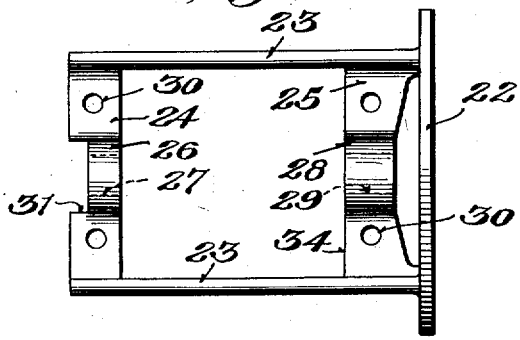
Fig. 4 is an elevation of one of the halves of the combined support and valve seat employed in the embodiment of Fig. 1.
Figure 6:
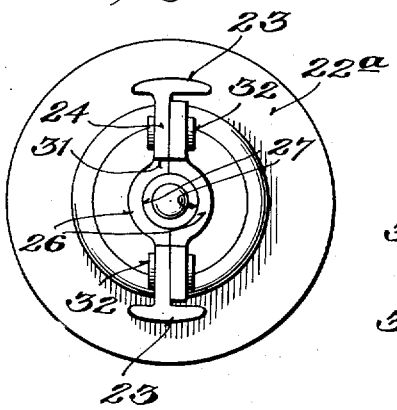
Fig. 6 is an end view of another embodiment of the present invention.
Figure 7:
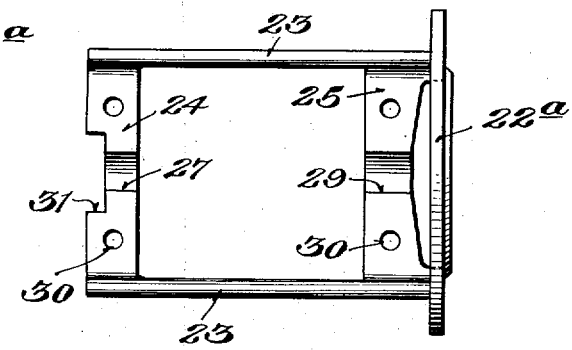
Fig. 7 is an elevation of the combined support and valve seat member of Fig. 6.

In conformity with the present invention means are provided for mounting a thermostat in operative position, guiding and preferably limiting, it during its expansive and contractive movements, and providing a valve seat for a valve member mounted on the valve stem 17, which means is composed of a minimum number of simply and inexpensively manufactured parts that can be easily and quickly assembled. In the form shown in Figs. 1 to 5 inclusive, the combined support and valve seat member is composed of two parts which are partible on a plane extending longitudinally of the thermostat. Preferably these two parts are duplicates, so that they may be assembled about a thermostat by engagement in a plane which includes the axis of the thermostat or the valve stem, although this is not essential as the two parts may be unlike if desired. As illustrated each part is composed of a semi-annular disk 22 from which projects a pair of integral legs 23, said legs being preferably parallel and extending at right angles to said semi-annular disk, although this is not essential. Said legs 23 are also connected by a pair of transverse members 24 and 25 which are also preferably formed integrally therewith. Transverse member 24, which extends between the legs 23 adjacent their extremities opposite from the semi-annular disk 22, is provided intermediate its length with a transverse portion 26 which is recessed at 27 at its inner face. Transverse member 25 connects said legs 23 adjacent the semi-annular disk 22, but is preferably spaced therefrom intermediate its length, as shown in Fig. 4, and said member 25 is similarly provided intermediate its length with a transverse portion 28 which is recessed at 29 at its inner face. Each of said transverse members 24 and 25 is also provided with one or more apertures 30 to receive attaching means as hereinafter described, and the transverse member 24 may be reduced in width at its portion 26, as shown at 31, for a purpose to be described.

Figure 2:
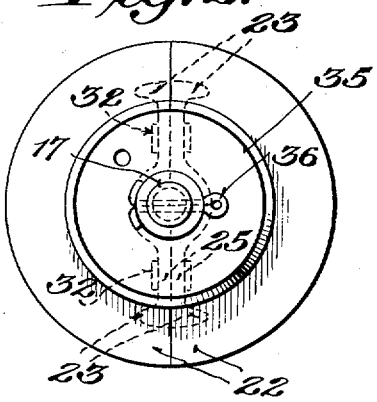
Fig. 2 is an end view of the embodiment of Fig. 1.
Figure 3:
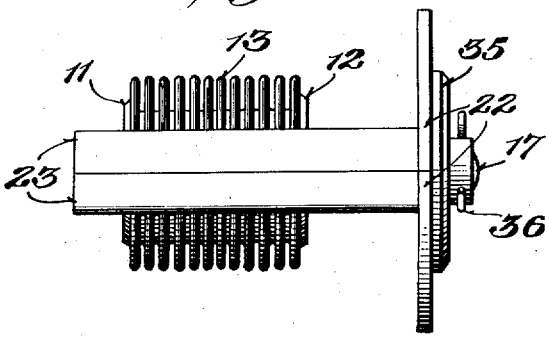
Fig. 3 is a side view of the embodiment of Fig. 1.
Figure 5:
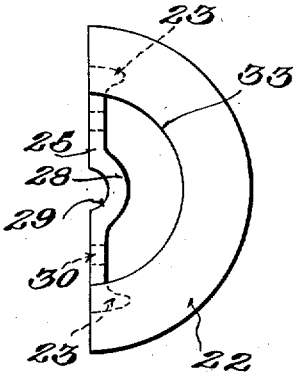
Fig. 5 is an end view of one of said halves.

As shown more particularly in Fig. 5, the legs 23 and transverse portions 24 and 25 are so disposed with respect to the chord of the semi-annular disk 22 that a pair of sections as heretofore described may be assembled as shown in Fig. 2 with the chordal faces of said semi-annular disks, the edges of the legs and the faces of the transverse members 24 and 25 in contact in a plane extending longitudinally of the thermostat and preferably embracing the axis thereof. When so assembled the two semi-annular disks constitute a complete annulus, as shown in Fig. 2, while the two pairs of transverse portions 24 and 25 respectively, constitute a pair of transverse members which are in face contact adjacent their extremities but which, intermediate their lengths, form apertures to receive the boss 14 and valve stem 17. When the two sections are duplicates recesses 27 and 29 are preferably semi-circular in shape, although any other suitable shape may be employed.

The parts of the thermostatically operated valve unit may be assembled by laying the thermostat on one of the two sections with its valve stem 17 disposed in the recess 29 and the reduced portion 15 of the boss 14 received in the recess 27, and the second section may then be applied to the first section, in inverted relation thereto, and the parts fixedly clamped in position by fastening elements 32 of any suitable character, such as rivets, passed through the aligned apertures 30 of the transverse portions 24 and 25. The thermostat may have been charged before assembly with the support, or if desired it may be charged after assembly by reason of the ready accessibility of the filling opening 19 in the boss 14 which projects exteriorly of the framework constituted by the legs 23 and the transverse portions 24 and 25 which form a rectangular opening within which the thermostat is positioned.

When so assembled the two semi-annular disks 22 constitute a valve seat provided with a large central valve opening 33 and, if desired, the face of said valve seat can be machined or ground for proper contact with the valve member. If it is desired to prevent leakage between the two portions of the valve seat, the contacting edges may be machined, or the two halves may be soldered together after they are assembled, or a gasket may be interposed between the two halves. The valve seat member is also preferably made of such a size that it projects radially around the valve member to a sufficient extent so that it may constitute a mounting member, of circular or other suitable shape, for the unit. The semi-annular sections 22 may be originally formed to size, or they may be machined to size after they are assembled. The two transverse portions 25, by reason of their recesses 29, embrace the valve stem 17, said recesses being made of such size that when the parts are assembled they form a guide for said valve stem. The inner edges 34 of said transverse portions 25 are also preferably so disposed as to constitute a stop for limiting the expansive movement of the thermostat. The two portions 24 by reason of their recesses 27 also embrace and clamp the boss 14 on the stationary end wall 11 of the thermostat, and the transverse portion 26 is preferably made of such width that it is snugly received within the groove 15 between the stationary end wall 11 and the head 16 of the boss 14, so that said stationary end wall is rigidly locked against displacement. It is to be understood that said transverse portions 24 and 25 may be cast or otherwise initially formed to size, or either or both may be subsequently machined to provide the suitably shaped recesses 27 and 29.

When the parts have been assembled as heretofore described, a valve disk 35 of any suitable size, construction and material may be mounted on the free end of the valve stem 17 in any suitable way, being shown as retained thereon by a cotter pin 36. Said valve member is preferably so mounted on the valve stem 17 that when the valve member is in contact with the valve seat, the stop 18, when used, is out of contact with the opposed wall of the thermostat.

The two sections of the combined support and valve seat member are preferably formed as castings, and each of said sections is also preferably cast as a unit, although if found desirable each of said sections may be built up of detachable parts, although this would increase the number of parts to be made and handled and therefore not obtain the full advantage of the present invention.

Figure 9:
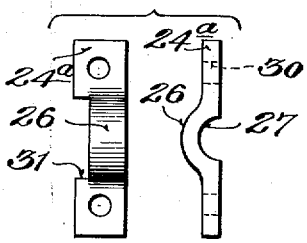
Fig. 9 is a side view and an end view of one of the clamping elements of the embodiment of Fig. 6.
Figure 8:
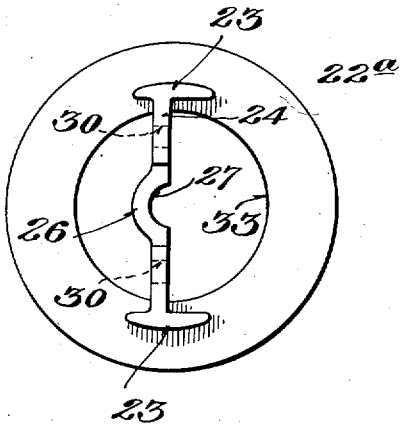
Fig. 8 is an end view of said member.
Figure 10:
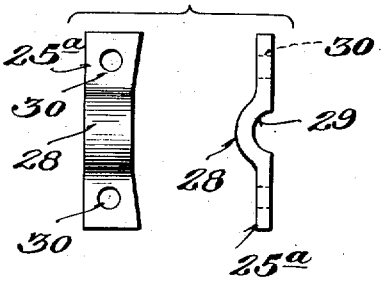
Fig. 10 is a side view and an end view of the other clamping element of the embodiment of Fig. 6.

In the form shown in Figs. 6 to 10 inclusive, the combined support and valve seat member is constructed as heretofore described except that the valve seat member 22ª is formed as a complete annulus and the thermostat is clamped to the transverse members 24 and 25 by separate clamping sections 24ª and 25ª, as shown in Figs. 9 and 10. Said clamping members 24ª and 25ª are preferably made as separate pieces, although if desired said members could be connected by legs 23, in which event the construction would be the same as in the embodiment of Figs. 1 to 5 except that the entire valve seat member would be integral with one of the sections, while the second section would be composed of the legs 23 and the transverse portions 24 and 25. Where separate clamping members 24ª and 25ª are used the legs 23 are preferably made of the form shown in Figs. 6 and 7 so as to have the requisite strength and rigidity and approximate in size the legs 23 as formed by the junction of the two sections of said legs in the form shown in Figs. 1 to 5. Otherwise the construction and manner of assembly and operation of the embodiment of Figs. 6 to 10 are or may be the same as that of the embodiment of Figs. 1 to 5. While it is preferred that the pieces 24ª and 25ª be duplicates of the transverse portions 24 and 25, it is to be understood that if desired the transverse portions 24 and 25 and 24ª and 25ª may not be duplicates, as it is not essential that the plane of severance of the parts coincide with a plane passing through the axis of the thermostat or the valve stem.

It will therefore be perceived that a simplified thermostatically operated valve unit has been provided wherein the thermostat is mounted in a combined support and valve seat member, which also preferably constitutes means for mounting the unit and for guiding and limiting the expansive and contractive movements of the thermostat, which is composed of a minimum number of easily and inexpensively manufactured parts that may be quickly assembled, so that units of this character may be produced with the minimum of expense and labor.

While the embodiments of the invention illustrated on the drawings have been described with considerable particularity it is to be expressly understood that the invention is not restricted thereto, as the invention is capable of receiving other mechanical expressions, as will now be apparent to those skilled in the art, while changes may be made in the details of construction, arrangement and proportion of parts without departing from the spirit of this invention. Reference is therefore to be had to the claims hereto appended for a definition of the limits of the invention.

What is claimed is:

1. In a thermostatically operated valve unit, in combination with a thermostat, a thermostat support having a valve seat formed integrally therewith and being composed of sections partible on a plane extending longitudinally of said thermostat.

2. In a thermostatically operated valve unit, in combination with a thermostat, a thermostat support having a valve seat formed integrally therewith and being composed of duplicate sections partible on a longitudinally extending plane.

3. In a thermostatically operated valve unit, in combination with a thermostat, a thermostat support and a valve seat member formed integrally therewith, said support being partible on a plane including the axis of the thermostat.

4. In a thermostatically operated valve unit, in combination with a thermostat, a thermostat support and a valve seat member formed integrally therewith, said support being composed of duplicate sections partible in a plane including the axis of the thermostat.

5. In a thermostatically operated valve unit, in combination with a thermostat, a thermostat support and a valve seat formed integrally therewith, said support and seat being composed of sections partible in a plane extending longitudinally of the thermostat.

6. In a thermostatically operated valve unit, in combination with a thermostat, a thermostat support and a valve seat formed integrally therewith, said support and seat being composed of duplicate sections partible in a plane including the axis of the thermostat.

7. In a thermostatically operated valve unit, in combination with a thermostat, a combined thermostat support and valve seat comprising a member having legs integral therewith and connected by transverse portions integrally formed therewith, one of said transverse portions providing means for rigidly securing said thermostat in position.

8. In a thermostatically operated valve unit, in combination with a thermostat, a combined thermostat support and valve seat comprising a member having legs integral therewith and connected by transverse portions integrally formed therewith, one of said transverse portions constituting a guide for the expansive and contractive movements of said thermostat.

9. In a thermostatically operated valve unit, in combination with a thermostat, a combined thermostat support and valve seat comprising a member having legs integral therewith and connected by transverse portions integrally formed therewith, one of said transverse portions constituting a stop for limiting the expansive movement of said thermostat.

10. In a thermostatically operated valve unit, in combination with a thermostat, a combined thermostat support and valve seat comprising a member having legs integral therewith and connected by transverse portions integrally formed therewith, said member constituting a mounting member for said support.

11. In a thermostatically operated valve unit, in combination with a thermostat, a combined thermostat support and valve seat comprising a member having legs integral therewith and connected by chordally extending transverse portions integrally formed therewith adjacent the opposite extremities thereof.

12. In a thermostatically operated valve unit, in combination with a thermostat, a combined thermostat support and valve seat composed of a member having legs integral therewith and connected by transverse members integrally formed therewith and means cooperating with said transverse members for retaining said thermostat in said support and providing means for rigidly securing said thermostat in position.

13. In a thermostatically operated valve unit, in combination with a thermostat, a combined thermostat support and valve seat composed of a member having legs integral therewith and connected by transverse members integrally formed therewith and means cooperating with said transverse members for retaining said thermostat in said support and providing means for guiding the expansive and contractive movements of said thermostat.

14. In a thermostatically operated valve unit, in combination with a thermostat, a combined thermostat support and valve seat composed of a member having legs integral therewith and connected by transverse members integrally formed therewith and means cooperating with said transverse members for retaining said thermostat in said support and providing means for limiting the expansive movement of said thermostat.

15. In a thermostatically operated valve unit, in combination with a thermostat, a combined thermostat support and valve seat composed of a member having legs integral therewith and connected by transverse members integrally formed therewith and means cooperating with said transverse members for retaining said thermostat in said support, said member also constituting a mounting member for said support.

16. In a thermostatically operated valve unit, in combination with a thermostat, a combined thermostat support and valve seat composed of a member having legs integral therewith and connected by transverse members integrally formed therewith and means cooperating with said transverse members for retaining said thermostat in said support, said transverse members extending chordally of said member adjacent the opposite extremities of said legs.

17. In a thermostatically operated valve unit, in combination with a thermostat, a partible valve seat member, legs extending from the member parts and formed integrally therewith, and transverse portions integrally connecting said legs and providing a support for said thermostat.

18. In a thermostatically operated valve unit, in combination with a thermostat, a partible valve seat member, legs extending from the member parts and formed integrally therewith, and transverse portions integrally connecting said legs and providing a support for said thermostat, said member also constituting a means for mounting said support.

19. In a thermostatically operated valve unit, in combination with a thermostat, a partible valve seat member, legs extending from the member parts and formed integrally therewith, and transverse portions integrally connecting said legs and providing a support for said thermostat, said transverse portions affording means for rigidly mounting said thermostat in fixed position.

20. In a thermostatically operated valve unit, in combination with a thermostat, a partible valve seat member, legs extending from the member parts and formed integrally therewith, and transverse portions integrally connecting said legs and providing a support for said thermostat, said transverse portions affording means for guiding the expansive and contractive movements of said thermostat.

21. In a thermostatically operated valve unit, in combination with a thermostat, a partible valve seat member, legs extending from the member parts and formed integrally therewith, and transverse portions integrally connecting said legs and providing a support for said thermostat, said transverse portions affording means for limiting the expansive movement of said thermostat.

22. In a thermostatically operated valve unit, in combination with a thermostat, a partible valve seat member, legs extending from the member parts and formed integrally therewith, and transverse portions integrally connecting said legs and providing a support for said thermostat, said member parts and transverse portions being connectible in a plane extending longitudinally of the thermostat.

23. In a thermostatically operated valve unit, in combination with a thermostat, a partible valve seat member, legs extending from the member parts and formed integrally therewith, and transverse portions integrally connecting said legs and providing a support for said thermostat, said member parts with their connected legs and transverse portions constituting duplicate parts.

24. In a thermostatically operated valve unit, in combination with a thermostat, a thermostat support composed of sections formed of cast metal and comprising longitudinally extending legs and transversely extending integral connecting portions partible on a plane extending longitudinally of said support, and a valve seat member cast integrally with said support.

25. In a thermostatically operated valve unit, in combination with a thermostat, a thermostat support composed of sections formed of cast metal and comprising longitudinally extending legs and transversely extending integral connecting portions partible on a plane extending longitudinally of said support, and a partible valve seat member the parts of which are cast integrally with the parts of said support.

26. In a thermostatically operated valve unit, in combination with a thermostat, an open rectangular thermostat support formed of cast metal and partible on a plane extending lengthwise of said support, and a valve seat member formed integrally therewith.

27. In a thermostatically operated valve unit, in combination with a thermostat, an open rectangular thermostat support formed of cast metal and partible on a plane extending lengthwise of said support, and a partible valve seat member cast integrally with said support and partible at said plane.

28. In a thermostatically operated valve unit, in combination with a thermostat, an open rectangular thermostat support formed of cast metal and partible on a plane extending lengthwise of said support, one side of said support providing means for rigidly mounting said thermostat in position.

29. In a thermostatically operated valve unit, in combination with a thermostat, an open rectangular thermostat support formed of cast metal and partible on a plane extending lengthwise of said support, one side of said support providing a guide for the expansive and contractive movements of said thermostat.

30. In a thermostatically operated valve unit, in combination with a thermostat, an open rectangular thermostat support formed of cast metal and partible on a plane extending lengthwise of said support, one of the sides of said support providing a stop for limiting the expansive movement of said thermostat.

31. In a thermostatically operated valve unit, in combination with a thermostat, an open rectangular thermostat support embracing said thermostat and formed of cast metal, opposed members of said support being partible in a plane extending lengthwise thereof and formed to embrace elements projecting from the opposite ends of the thermostat, and a valve seat member cast integral with said support.

32. In a thermostatically operated valve unit, in combination with a thermostat, an open rectangular thermostat support embracing the thermostat and formed of cast metal, said support being partible in a plane extending lengthwise of said thermostat, and a valve seat member composed of sections each of which is cast integral with one of the parts of said support.

33. In a device of the character described, in combination with a thermostat, a valve stem and a valve disk operatively connected thereto, a cage for said thermostat composed of a head portion and a base portion connected by longitudinally extending ribs, said head portion having an integral valve stem guide and an integral flange constituting a valve seat for said valve disk.

34. In a device of the character described, in combination with a thermostat, a valve stem and a valve disk operatively connected thereto, a cage for said thermostat composed of a head portion and a base portion connected by longitudinally extending ribs, said head portion having a valve port in its end opposite said thermostat, and a spider integrally connected with said cage, said spider having a centrally arranged hub forming a guide for said valve stem.

35. In a device of the character described, in combination with a thermostat, a valve disk operatively connected thereto, a cage for said thermostat composed of a head portion and a base portion connected by longitudinally extending ribs, said head portion having a valve port in its end opposite said thermostat, and a spider integrally connected with said cage, said spider cooperating with said thermostat to limit the expansive movement thereof.

36. In a device of the character described, in combination with a thermostat, a valve disk operatively connected thereto, a cage of cast metal for said thermostat having a head portion provided with a valve port and an integrally formed flange around said port which constitutes a seat for said valve disk, and a spider cast integrally with said cage.

37. In a device of the character described, in combination with a thermostat, a valve disk operatively connected thereto, and a cage for said thermostat composed of a head portion and a base portion connected by longitudinally extending ribs, said head portion having a valve port, and a valve stem guide integrally connected to said ribs.

38. In a device of the character described, in combination with a thermostat, a valve disk operatively connected thereto, and a cage for said thermostat composed of a head portion and a base portion connected by longitudinally extending ribs, said head portion having a valve port, and a spider formed integrally with said ribs and having an integral centrally arranged elongated tubular hub.

39. In a device of the character described, in combination with a thermostat, a valve disk operatively connected thereto, a cage for said thermostat composed of a head portion and a base portion connected by longitudinally extending ribs, said head portion having a valve port, and a spider formed integrally with said ribs and forming a stop for the expansive movements of said thermostat.

40. In a device of the character described, in combination with a thermostat having a valve stem and a valve disk operatively connected thereto, a member providing a seat for said valve, a centrally arranged hub forming a guide for said valve stem, and relatively deep narrow arms connecting said hub with said member.

41. In a device of the character described, in combination with a thermostat, a valve disk operatively connected thereto, a cage for said thermostat provided with a valve port, and a spider associated with said port having radially extending arms integrally connected to said cage and forming a stop for said thermostat.

42. In a device of the character described, a thermostat, a valve stem connected thereto and carrying a valve member, a cage for said thermostat provided with a valve port, and a spider associated with said port having radially extending arms integrally connected to said cage and having an integral hub forming a valve stem guide.

In testimony whereof I have signed this specification.

JEAN V. GIESLER.